(12) United States Patent
Walker et al.

(10) Patent No.: US 9,932,912 B2
(45) Date of Patent: Apr. 3, 2018

(54) METHODS AND SYSTEMS FOR EMISSIONS CONTROL IN A DUAL FUEL ENGINE

(75) Inventors: David James Walker, Niskayuna, NY (US); Narendra Joshi, Niskayuna, NY (US); Adam Klingbeil, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1934 days.

(21) Appl. No.: 13/041,254

(22) Filed: Mar. 4, 2011

(65) Prior Publication Data

US 2012/0222400 A1 Sep. 6, 2012

(51) Int. Cl.

| | |
|---|---|
| *F01N 3/00* | (2006.01) |
| *F02D 19/08* | (2006.01) |
| *F01N 3/36* | (2006.01) |
| *F02D 41/00* | (2006.01) |
| *F02D 41/02* | (2006.01) |
| *F02D 41/40* | (2006.01) |
| *F02M 43/00* | (2006.01) |
| *F02B 37/18* | (2006.01) |
| *F02D 19/06* | (2006.01) |

(52) U.S. Cl.
CPC .............. *F02D 19/08* (2013.01); *F01N 3/36* (2013.01); *F02D 19/061* (2013.01); *F02D 19/0615* (2013.01); *F02D 19/0652* (2013.01); *F02D 19/0689* (2013.01); *F02D 19/0692* (2013.01); *F02D 41/0025* (2013.01); *F02D 41/0275* (2013.01); *F02D 41/405* (2013.01); *F02M 43/00* (2013.01); *F01N 2560/026* (2013.01); *F01N 2560/14* (2013.01); *F01N 2610/03* (2013.01); *F02B 37/18* (2013.01); *F02D 19/0628* (2013.01); *F02D 19/0697* (2013.01); *F02D 19/081* (2013.01); *Y02T 10/20* (2013.01); *Y02T 10/36* (2013.01); *Y02T 10/44* (2013.01)

(58) Field of Classification Search
CPC .. F01N 3/36; F01N 2560/026; F01N 2560/14; F01N 2610/03; F02D 19/061; F02D 19/0615; F02D 19/0652; F02D 19/0689; F02D 19/0692; F02D 19/08; F02D 41/0025; F02D 41/0275; F02D 41/405; F02D 19/0628; F02D 19/0697; F02D 19/081; F02M 43/00; F02B 37/18; Y02T 10/20; Y02T 10/36; Y02T 10/44
USPC ........... 60/274, 286, 299, 301, 303; 123/435
See application file for complete search history.

(56) References Cited

U.S. PATENT DOCUMENTS 7,090,811 B2 8/2006 Cho et al.
7,257,945 B2 8/2007 Kass et al.
(Continued)

OTHER PUBLICATIONS

Kamalakannan, Power Electronics and Renewable Energy Systems 2014, Springer, pp. Cover, Title Page, and p. 1057-1066.*

(Continued)

*Primary Examiner* — Jason Shanske
*Assistant Examiner* — Matthew T Largi
(74) *Attorney, Agent, or Firm* — John P. Darling

(57) ABSTRACT

Various methods and systems are provided for an engine with an exhaust gas treatment system. In one example, under a first condition, a first fuel is delivered for combustion in the engine. Under a second condition, a second fuel is delivered for combustion in the engine, the second fuel different than the first fuel. Under a third condition, the first fuel is delivered as a reductant for the exhaust gas treatment system.

21 Claims, 7 Drawing Sheets

(56) References Cited

U.S. PATENT DOCUMENTS

| | | | |
|---|---|---|---|
| 7,284,506 | B1 | 10/2007 | Sun et al. |
| 7,428,810 | B2 * | 9/2008 | Driscoll .......................... 60/286 |
| 2001/0015193 | A1 | 8/2001 | Tanaka et al. |
| 2002/0162325 | A1 * | 11/2002 | Kato et al. ....................... 60/297 |
| 2003/0033800 | A1 * | 2/2003 | Tonetti et al. .................. 60/286 |
| 2004/0261403 | A1 | 12/2004 | Asmus et al. |
| 2007/0125321 | A1 * | 6/2007 | Ritter ....................... 123/27 GE |
| 2007/0245719 | A1 | 10/2007 | Driscoll |
| 2008/0053073 | A1 | 3/2008 | Kalyanaraman et al. |
| 2009/0173061 | A1 | 7/2009 | Vitse et al. |
| 2010/0018187 | A1 * | 1/2010 | Matsumoto et al. ........... 60/286 |
| 2010/0192545 | A1 | 8/2010 | Schmieg et al. |
| 2010/0263639 | A1 * | 10/2010 | Uhrich et al. ................. 123/564 |
| 2011/0023855 | A1 * | 2/2011 | Van Nieuwstadt et al. .. 123/703 |
| 2011/0036310 | A1 | 2/2011 | Ichikawa et al. |
| 2011/0131957 | A1 * | 6/2011 | Hepburn et al. ................ 60/278 |
| 2011/0132321 | A1 * | 6/2011 | Pursifull ....................... 123/299 |

OTHER PUBLICATIONS

Morris, Academic Press Dictionary of Science and Technology 1992, Academic Press, pp. Cover, Title Page, and p. 2093.*

Petersen, Fiber Optics Illustrated Dictionary 2003, CRC Press LLC, pp. Cover, Title Page, and p. 768.*

Kass et al., "Selective Catalytic Reduction of Diesel Engine Nox Emissions using Ethanol as a Reductant", U.S. Department of Energy 9th Diesel Engine Emissions Reduction Conference, pp. 1-8, Aug. 24-28, 2003.

Xiaoyan et al., "Combination of Biodiesel-Ethanol-Diesel Fuel Blend and SCR Catalyst Assembly to Reduce Emissions from a Heavy-Duty Diesel Engine", Journal of Environmental Sciences, pp. 177-182, 2007.

Search Report from corresponding PCT Application No. PCT/US2012/025838 dated May 21, 2012.

* cited by examiner

METHODS AND SYSTEMS FOR EMISSIONS CONTROL IN A DUAL FUEL ENGINE

FIELD

The subject matter disclosed herein relates to methods and systems for a dual fuel engine with an exhaust gas treatment system.

BACKGROUND

Compression ignition engines (e.g., diesel engines) are a type of internal combustion engine which use heat of compression to initiate ignition and burn fuel. Compression ignition engines may have a higher thermal efficiency than other internal combustion engines, such as spark ignition engines, for example. However, compression ignition engines may have increased emissions (e.g., nitrogen oxides ($NO_x$), particulates, or the like), as compared to other internal combustion engines. The increased amount of $NO_x$ is attributed to diffusion flame combustion. In the diffusion flame, fuel is oxidized in a stoichiometric fashion which produces relatively high local temperatures. The high local temperatures produce increased levels of $NO_x$. Further, the increased particulate emissions are based upon the heterogeneous combustion event in which local equivalence ratios are high and a tendency for particulate formation increases. As such, an exhaust gas treatment system may be coupled to an exhaust passage of the engine in order to reduce emissions.

In some examples, emissions may be reduced by operating the compression ignition engine as a dual fuel engine which operates using two different fuels, for example, a low reactivity fuel (e.g., natural gas) and a high reactivity fuel (e.g., diesel). In such an example, the engine may have two fuel systems for each of the fuels. Further, the exhaust gas treatment system may include a reductant system so that a reductant can be delivered to an exhaust gas treatment device for reduction of $NO_x$, for example. As such, an amount of space occupied by the engine and exhaust gas treatment system may be increased.

BRIEF DESCRIPTION

In one embodiment, a method for an engine with an exhaust gas treatment system includes, under a first condition, delivering a first fuel for combustion in the engine. The method further includes, under a second condition, delivering a second fuel for combustion in the engine, where the second fuel is different than the first fuel. Under a third condition, the method further includes, delivering the first fuel as a reductant for the exhaust gas treatment system.

By using at least two different types of fuel for combustion, the combustion rate may be moderated. For example, a combustion event may be triggered by delivering each of the fuels at different times based on the first and second conditions, thus improving control of ignition timing. Further, based on the composition of the first and second fuels, the efficiency of the engine may be increased and emissions may be reduced. The first fuel may further serve as a reductant for the exhaust gas treatment device, thereby reducing the need for a separate system for the reductant and reducing an overall size of the engine and exhaust gas treatment system.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of methods and systems for a dual fuel engine with an exhaust gas treatment system. In one example embodiment, a method includes, under a first condition, delivering a first fuel for combustion in the engine. The method further includes, under a second condition, delivering a second fuel for combustion in the engine, where the second fuel is different than the first fuel. For example, the first fuel may be ethanol and the second fuel may be diesel. Under a third condition, the method further includes, delivering the first fuel as a reductant for the exhaust gas treatment system. In some embodiments, the first and second fuels may be directly injected to the engine. In other embodiments, the first fuel may be port injected and the second fuel may be direct injected. In such an embodiment, the first fuel is also injected upstream of an exhaust gas treatment device in the exhaust gas treatment system.

Figure 1:
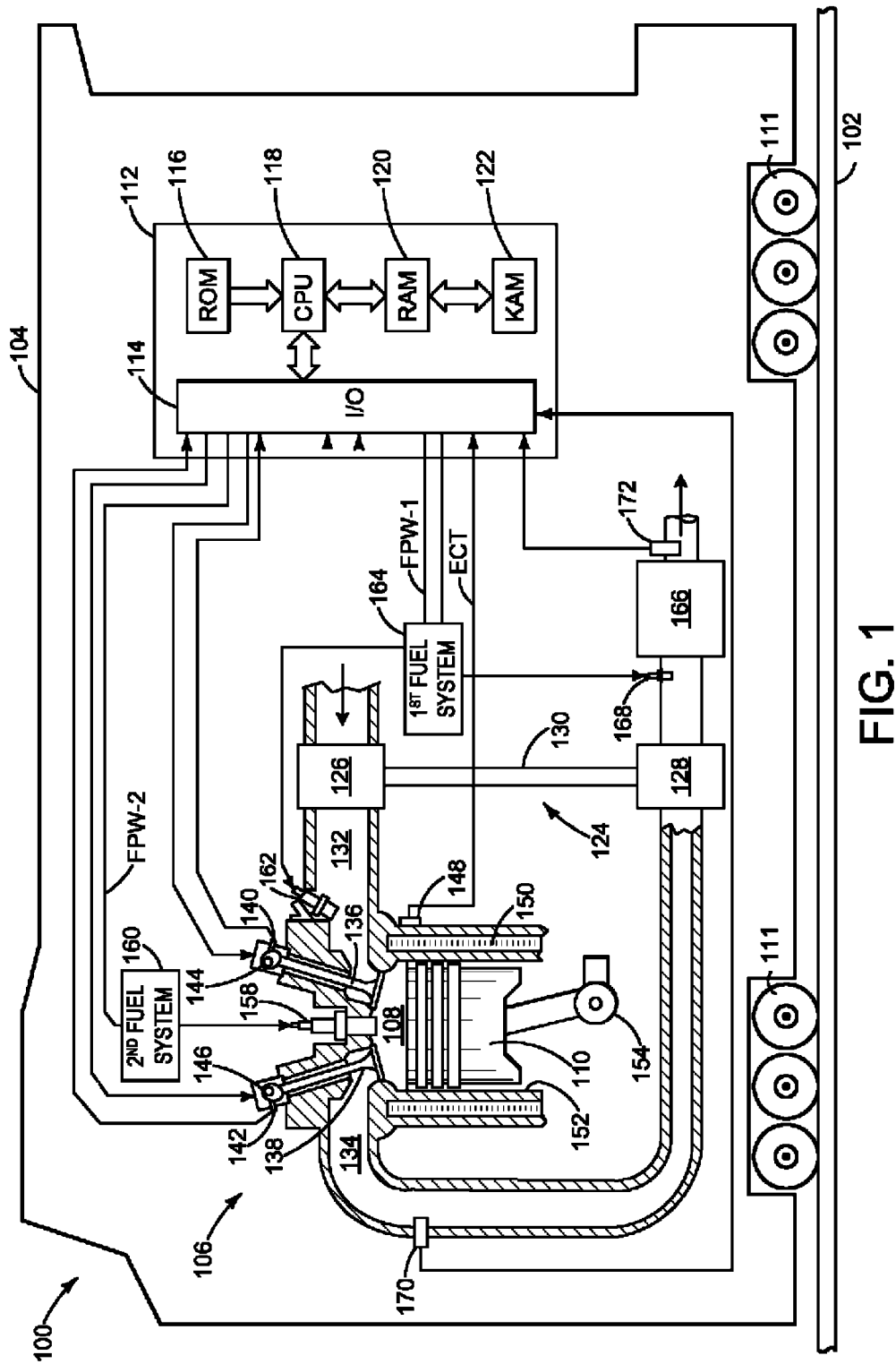
FIG. 1 shows a schematic diagram of an example embodiment of a rail vehicle with a dual fuel engine according to an embodiment of the invention.

In some embodiments, the engine and exhaust gas treatment system are configured to be positioned in a vehicle, such as a rail vehicle. For example, FIG. 1 shows a schematic diagram of an example embodiment of a vehicle system 100 (e.g., a locomotive system), herein depicted as a rail vehicle 104, configured to run on a rail 102 via a plurality of wheels 111. As depicted, the rail vehicle 104 includes an exhaust gas treatment system coupled to an engine 106, such as an internal combustion engine. In other non-limiting embodiments, engine 106 may be a stationary engine, such as in a power-plant application, or an engine in a ship propulsion system.

FIG. 1 depicts an example embodiment of a combustion chamber, or cylinder, of a multi-cylinder internal combustion engine 106. The engine 106 may be controlled at least partially by a control system including controller 112. The cylinder (i.e., combustion chamber) 108 of engine 106 may include combustion chamber walls 152 with a piston 110 positioned therein. The piston 110 may be coupled to a crankshaft 154 so that reciprocating motion of the piston is translated into rotational motion of the crankshaft. In some embodiments, the engine 106 may be a four-stroke engine in which each of the cylinders fires in a firing order during two revolutions of the crankshaft 154. In other embodiments, the engine 106 may be a two-stroke engine in which each of the cylinders fires in a firing order during one revolution of the crankshaft 154.

The cylinder 108 receives intake air for combustion from an intake passage 132. The intake passage 132 receives ambient air from an air filter (not shown) that filters air from outside of the rail vehicle 104. The intake air passage 132 may communicate with other cylinders of engine 106 in addition to cylinder 108, for example.

In some embodiments, one or more of the intake passages may include a boosting device such as a turbocharger. For example, FIG. 1 shows engine 106 configured with a turbocharger 124 including a compressor 126 arranged in the intake passage 132, and an exhaust turbine 128 arranged along the exhaust passage 134. The compressor 126 may be at least partially powered by the exhaust turbine 128 via a shaft 130. The turbocharger 124 increases air charge of ambient air drawn into the intake passage 132 in order to provide greater charge density during combustion to increase power output and/or engine-operating efficiency. While in this case a single turbocharger is included, the system may include multiple turbine and/or compressor stages.

Exhaust gas resulting from combustion in the engine 106 is supplied to an exhaust passage 134. Exhaust gas flows through the exhaust passage 134 and out of an exhaust stack (not shown) of the rail vehicle 104. The exhaust passage 134 may further receive exhaust gases from other cylinders of engine 106 in addition to cylinder 108, for example.

The vehicle system 100 further includes an exhaust gas treatment system coupled in the exhaust passage downstream of the turbine 128 of the turbocharger 124. The exhaust gas treatment system includes an exhaust gas treatment device 166. For example, the exhaust gas treatment device 166 may be a selective catalytic reduction (SCR) catalyst for reducing nitrogen oxide ($NO_x$) species in the exhaust gas stream. The SCR catalyst may include silver in the washcoat formulation. In other examples, the exhaust gas treatment device may be a diesel oxidation catalyst (DOC), a diesel particulate filter (DPF), or the like for reducing particulate matter in the exhaust gas stream. In other embodiments, the exhaust gas treatment system may additionally, or alternatively, include a three way catalyst (TWC), $NO_x$ trap, various other emission control devices, or combinations thereof.

Further, in the example embodiment depicted in FIG. 1, the exhaust gas treatment system includes an injector 168 positioned upstream of the exhaust gas treatment device 166 to inject a reductant to the exhaust gas treatment device. In the example shown in FIG. 1, the reductant is the first fuel stored in the first fuel system 164. For example, the first fuel may be ethanol or another fuel containing alcohol. In such an embodiment, the need for a separate system for the reductant, such as when urea is the reductant, is reduced. As such, an amount of space occupied by the exhaust gas treatment system is reduced.

The vehicle system 100 further includes a first exhaust gas sensor 170 coupled in the exhaust passage 134 upstream of the turbine 128 of the turbocharger 124. A second exhaust gas sensor 172 is disposed downstream of the exhaust gas treatment device 166 in the exhaust passage 134. Each exhaust gas sensor 170 and 172 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a $NO_x$, HC, or CO sensor. By including an exhaust gas sensor upstream and downstream of the exhaust gas treatment device, information about the system such as $NO_x$ conversion efficiency may be determined, for example.

Each cylinder of the engine 106 may include one or more intake valves and one or more exhaust valves. For example, the cylinder 108 is shown including one intake poppet valve 136 and one exhaust poppet valve 138 located in an upper region of cylinder 108. In some embodiments, each cylinder of the engine 106, including cylinder 108, may include two or more intake poppet valves and two or more exhaust poppet valves located at an upper region of the cylinder.

The intake valve 136 may be controlled by the controller 112 via actuator 144. Similarly, the exhaust valve 138 may be controlled by the controller 112 via actuator 146. During some conditions, the controller 112 may vary the signals provided to actuators 144 and 146 to control the opening and closing of the respective intake and exhaust valves. The position of intake valve 136 and exhaust valve 138 may be determined by respective valve position sensors 140 and 142, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing, or fixed cam timing may be used. In other embodiments, the intake and exhaust valves may be controlled by a common valve actuator or actuation system, or a variable valve timing actuator or actuation system.

In the example embodiment of FIG. 1, the controller 112 is shown as a microcomputer. The controller 112 includes microprocessor unit 118, input/output ports 114, an electronic storage medium, which includes code for enabling on-board monitoring and control of rail vehicle operation shown as read only memory chip 116 in this particular example, random access memory 120, keep alive memory 122, and a data bus. Storage medium read-only memory 116 can be programmed with computer readable data representing instructions executable by processor 118 for performing the methods described below as well as other variants that are anticipated but not specifically listed.

The controller 112, while overseeing control and management of the vehicle system 100, may be configured to receive signals from a variety of engine sensors, as further elaborated herein, in order to determine operating parameters and operating conditions, and correspondingly adjust various engine actuators to control operation of the rail vehicle 104. For example, the controller 112 may receive signals from various engine sensors including, but not limited to, engine speed, engine load, boost pressure, exhaust pressure, ambient pressure, exhaust temperature, engine coolant temperature (ECT) from temperature sensor 148 coupled to cooling sleeve 150, etc. Correspondingly, the controller 112 may control the vehicle system 100 by sending commands to various components such as traction motors, alternator, cylinder valves, throttle, etc.

Figure 5:
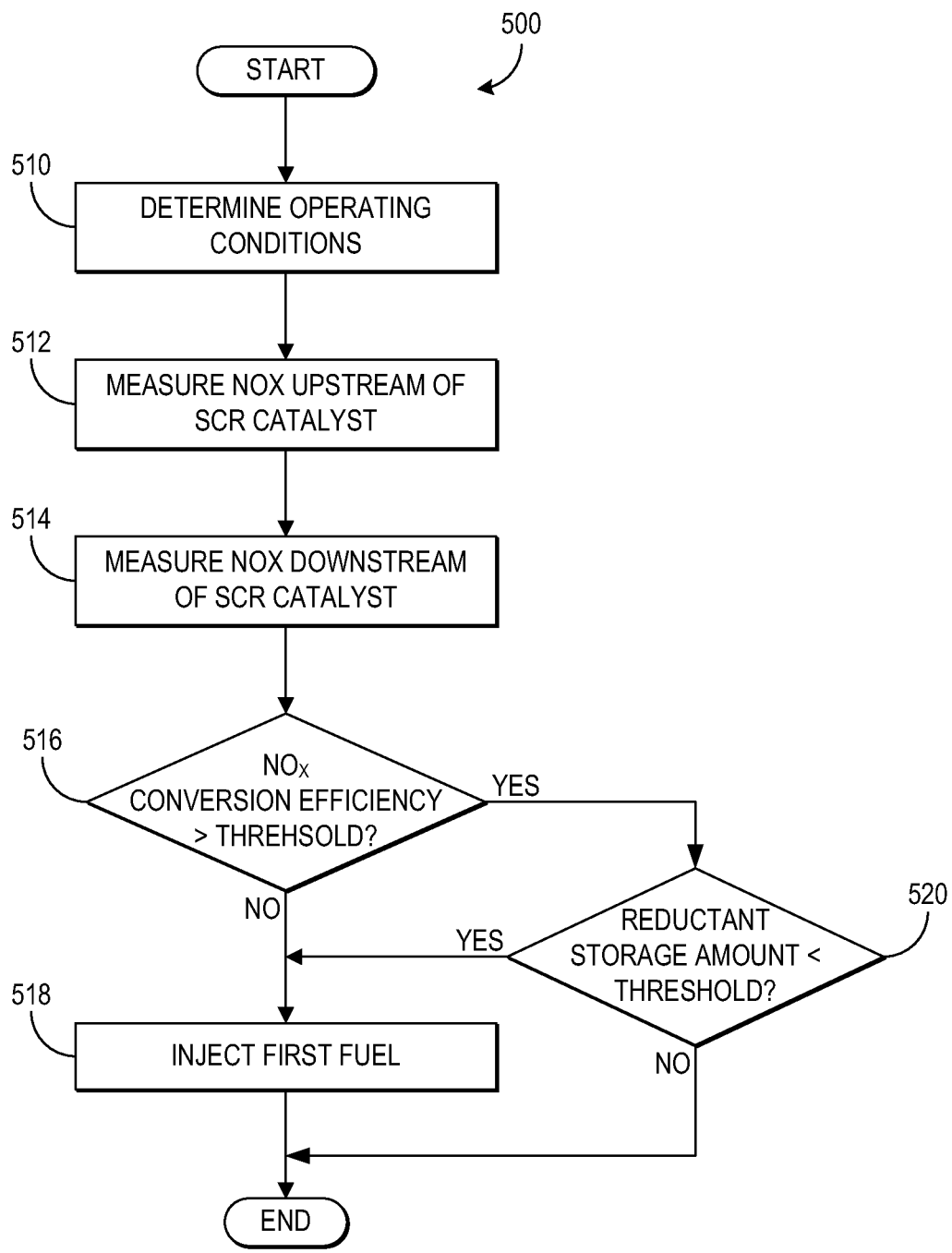
FIG. 5 shows a flow chart illustrating a method for delivering fuel to an exhaust gas treatment device coupled to a dual fuel engine.
Figure 6:
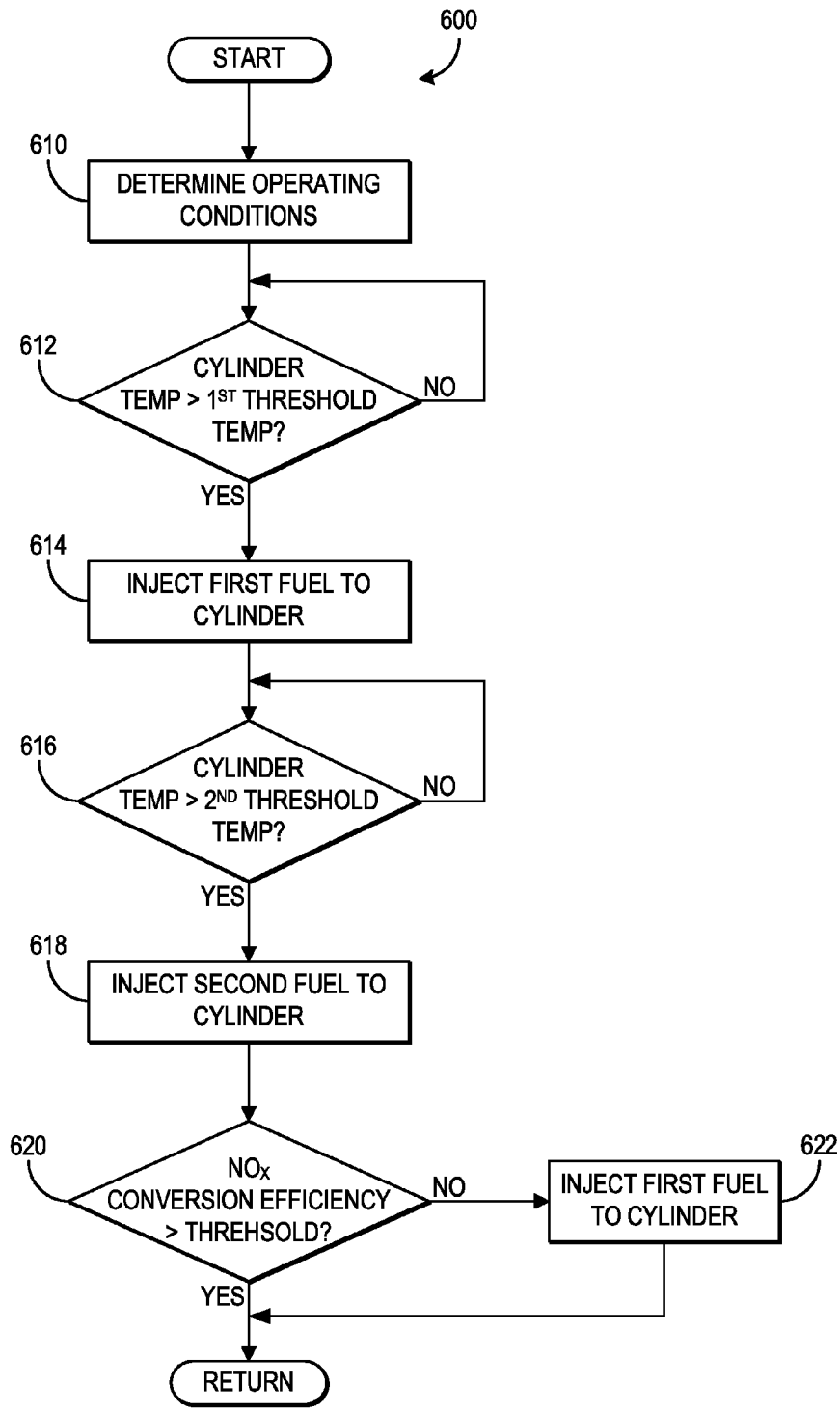
FIG. 6 shows a flow chart illustrating a method for delivering fuel to cylinders of a dual fuel engine and for delivering fuel to an exhaust gas treatment device coupled to the engine.

As further elaborated with reference to FIGS. 5 and 6, in some embodiments, the controller 112 may receive communication from one or more exhaust gas sensors (e.g., NO sensors) 170 and 172 positioned in the exhaust passage 134. In response to communication from the exhaust gas sensors 170 and 172, the controller 112 may send a signal to the first fuel system 164 to inject the first fuel (e.g., ethanol) in the exhaust passage 134 as a reductant, for example. In this manner, the reductant may be injected to the exhaust gas treatment device 166 when the system indicates a need for reductant based on signals from the exhaust gas sensors 170 and 172, for example. As such, a build-up of reductant, which may result in reductant slip, may be reduced.

In some embodiments, each cylinder of engine 106 may be configured with one or more fuel injectors for providing fuel thereto. As a non-limiting example, FIG. 1 shows the cylinder 108 is including a first fuel injector 162 and a second fuel injector 158. The second fuel injector 158 is shown coupled directly to cylinder 108 for injecting fuel directly therein in proportion to the pulse width of signal FPW-2 received from controller 112. In this manner, fuel injector 158 provides what is known as direct injection (hereafter referred to as "DI") of a second fuel into combustion cylinder 108. The second fuel may be delivered to the second fuel injector 158 from high pressure fuel system 160 including a fuel tank, fuel pumps, and a fuel rail. Alternatively, the second fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to the controller 112. In one example, the second fuel is diesel fuel that is combusted in the engine through compression ignition. In other non-limiting embodiments, the second fuel may be gasoline, kerosene, biodiesel, or other petroleum distillates of similar density through compression ignition (and/or spark ignition).

The first fuel injector provides DI of a first fuel into combustion cylinder 14. The first fuel may be delivered to the cylinder 108 via the first fuel injector 162 from high pressure fuel system 164 including a fuel tank, fuel pump, and a fuel rail. Alternatively, the first fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to the controller 112. In one example, the first fuel is ethanol that is combusted in the engine through compression ignition. In other non-limiting embodiments, the first fuel may be another alcohol containing fuel such as methanol, a blend containing alcohol and another substance such as water, or the like.

The first fuel injector 162 is shown arranged in intake passage 132, rather than in the cylinder 108, in a configuration that provides what is known as port injection of fuel (hereafter referred to as "PFI") into the intake port upstream of the cylinder 108. The first fuel injector 162 may inject fuel in proportion to the pulse width of signal FPW-1 received from the controller 112. The first fuel may be delivered to fuel injector 162 by the second fuel system 164 including a fuel tank, a fuel pump, and a fuel rail.

Fuel may be delivered by both injectors to the cylinder during a single cycle of the cylinder. For example, each injector may deliver a portion of a total fuel injection that is combusted in the cylinder 108. Further, the distribution and/or relative amount of fuel delivered from each injector may vary with operating conditions. The relative distribution of the total injected fuel among injectors 158 and 162 may be referred to as an injection type. For example, injecting all of the first fuel for a combustion event via the first injector 162 may be an example of a first injection type, injecting all of the second fuel for a combustion event via the second injector 158 may be an example of a second injection type, injecting three-quarters of the first fuel for a combustion event via the first injector 162 and a quarter of the second fuel via the second injector 158 may be an example of a third injection type, injecting a quarter of the first fuel for a combustion event via the first injector 162 and the three-quarters of the second fuel via the second injector 158 may be an example of a fourth injection type. Note that these are merely examples of different injection types, and various other types of injection and delivery may be used, and further the approach may be applied to more than two injectors as well.

Additionally, it should be appreciated that port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke; during the intake stroke, and partly during the compression stroke, for example. As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

Fuel injectors 158 and 162 may have different characteristics. These include differences in size, for example, one injector may have a larger injection hole than the other. Other differences include, but are not limited to, different spray angles, different operating temperatures, different targeting, different injection timing, different spray characteristics, different locations, etc. Moreover, depending on the distribution ratio of injected fuel among injectors 158 and 162, different effects may be achieved.

Figure 2:
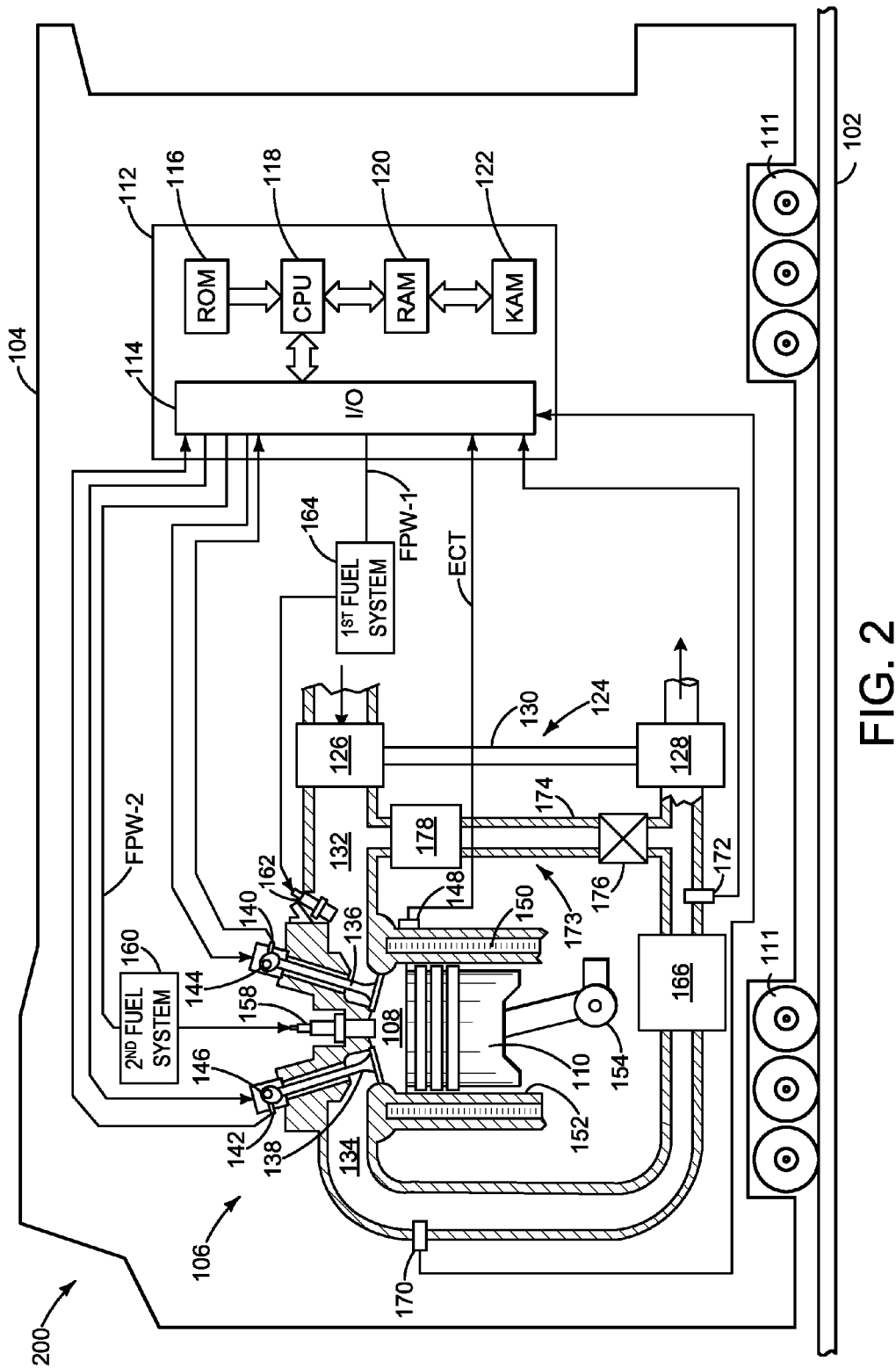
FIG. 2 shows a schematic diagram of an example embodiment of a rail vehicle with a dual fuel engine according to an embodiment of the invention.

FIG. 2 shows another example embodiment of a dual fuel engine 106 in a rail vehicle 104. The embodiment illustrated in FIG. 2 is comprised of many of the same components as the embodiment illustrated in FIG. 1. Accordingly, those components which function similarly to those illustrated in FIG. 1 are identified by like reference numerals in FIG. 2 and may not be described again.

In the embodiment depicted in FIG. 2, the first fuel injector 162 is a port fuel injector and the second fuel injector 158 is a direct fuel injector, as in the example embodiment depicted in FIG. 1. In contrast to the example embodiment depicted in FIG. 1, the exhaust gas treatment device 166 is positioned upstream of the turbine 128 of the turbocharger 124 in the example of FIG. 2. Further, vehicle system 200 shown in FIG. 2 does not include a fuel injector disposed in the exhaust passage 134 upstream of the exhaust gas treatment device.

In such an embodiment as that shown in FIG. 2, the first fuel injector (e.g., the port fuel injector) 162 may be controlled to deliver the first fuel to the cylinder 108 at least twice during the engine cycle. For example, in one embodiment, under a first condition, the first fuel (e.g., ethanol) may be delivered for combustion in the engine, the second fuel (e.g., diesel) may be delivered for combustion in the engine under a second condition, and the first fuel may be delivered as a reductant for the exhaust gas treatment system under a third condition, as will be described in greater detail below with reference to FIG. 6. In such an embodiment, the first and second conditions may be based on temperature in the cylinder, for example, and the third condition may be based an amount of $NO_x$ in the exhaust gas stream. The second injection of the first fuel may occur just before an intake stroke, for example, when the exhaust valve and intake valve are open such that the second fuel bypasses combustion in the engine and flows to the exhaust gas treatment device 166 where it serves as a reductant.

The vehicle system 200 further includes an exhaust gas recirculation (EGR) system 173, which routes exhaust gas from the exhaust passage 134 upstream of the turbine 128 to the intake passage downstream of the compressor 126 of the turbocharger 124. The EGR system 173 includes an EGR passage 174 and an EGR valve 176 for controlling an amount of exhaust gas that is recirculated from the exhaust passage 134 of engine 106 to the intake passage 132 of engine 104. By introducing exhaust gas to the cylinder 108, the amount of available oxygen for combustion is decreased, thereby reducing the combustion flame temperatures and reducing the formation of nitrogen oxides (e.g., $NO_x$). The EGR valve 176 may be an on/off valve controlled by the controller 112, or it may control a variable amount of EGR, for example. In some embodiments, as shown in FIG. 2, the EGR system 173 further includes an EGR cooler 178 to reduce the temperature of the exhaust gas before it enters the intake passage 132. As shown in the non-limiting example embodiment of FIG. 2, the EGR system 173 is a high-pressure EGR system. In other embodiments, the vehicle system 100 may additionally or alternatively include a low-pressure EGR system, routing EGR from downstream of the turbine to upstream of the compressor.

In the example embodiment illustrated in FIG. 2, when the first fuel is used a reductant, as described above, reductant slip may occur when a reductant storage amount is greater than a threshold amount, for example. By positioning the exhaust gas treatment device 166 upstream of the high-pressure EGR inlet, reductant slip may follow the loop of the EGR system 173. As such, the reductant slip may flow back to the intake passage 132 and enter the cylinder 108 for combustion, for example, thereby reducing an amount of reductant slip that may be emitted to the atmosphere.

Figure 3:
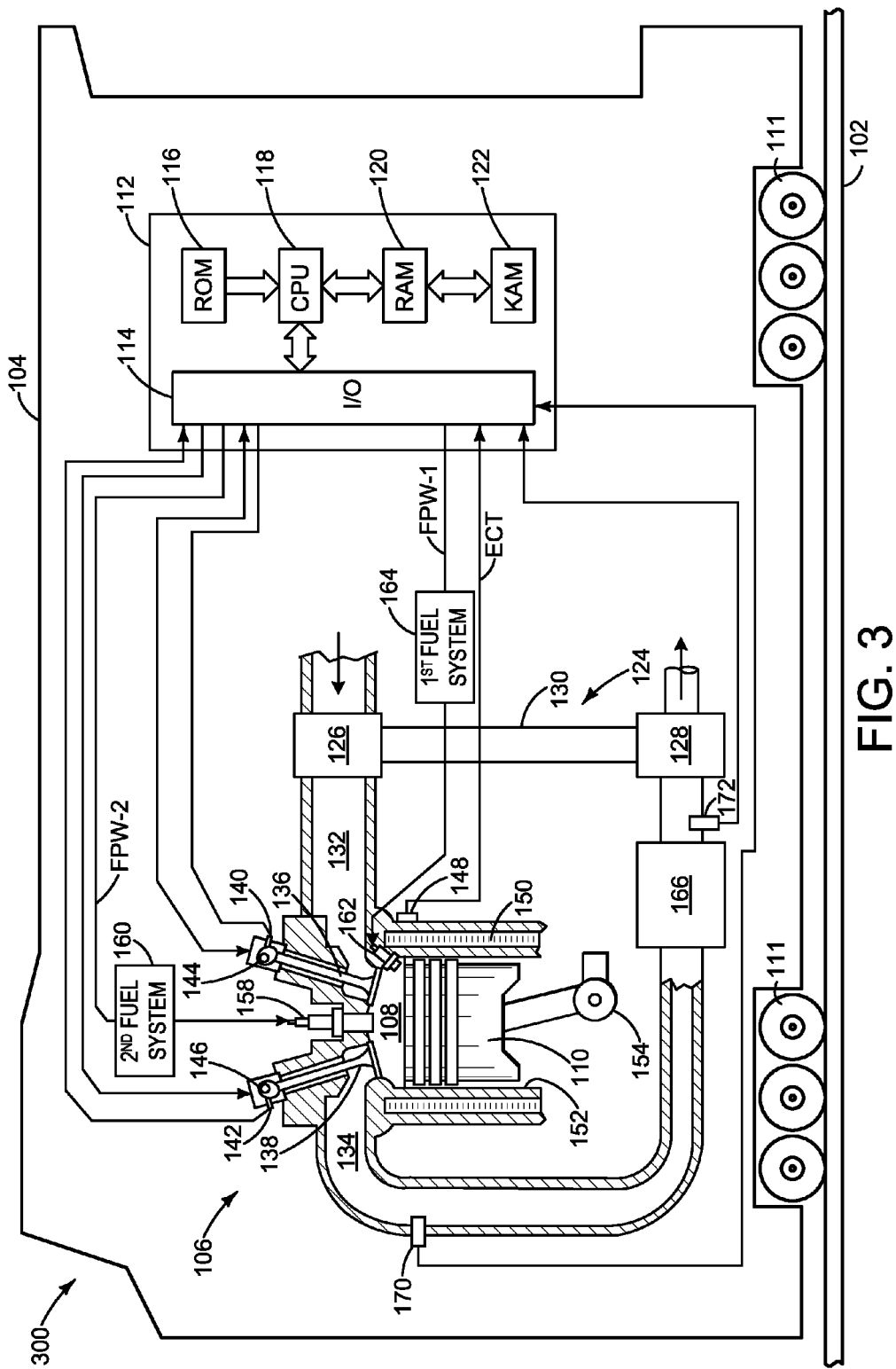
FIG. 3 shows a schematic diagram of an example embodiment of a rail vehicle with a dual fuel engine according to an embodiment of the invention.

FIG. 3 shows another example embodiment of a dual fuel engine 106 in a rail vehicle 104. The embodiment illustrated in FIG. 3 is comprised of many of the same components as the embodiments illustrated in FIGS. 1 and 2. Accordingly, those components which function similarly to those illustrated in FIGS. 1 and 2 are identified by like reference numerals in FIG. 3 and may not be described again.

In the embodiment depicted in FIG. 3, the first fuel injector 162 is a direct fuel injector and the second fuel injector 158 is a direct fuel injector. Further, the exhaust gas treatment device 166 is positioned upstream of the turbine 128 of the turbocharger 124 in the example of FIG. 3. Further still, vehicle system 300 does not include a fuel injector disposed in the exhaust passage 134 upstream of the exhaust gas treatment device.

In an embodiment such as that depicted in FIG. 3, the first fuel injector (e.g., the port fuel injector) 162 may be controlled to deliver the first fuel to the cylinder 108 at least twice during the engine cycle. For example, in one embodiment, under a first condition, the first fuel (e.g., ethanol) may be delivered for combustion in the engine, the second fuel (e.g., diesel) may be delivered for combustion in the engine under a second condition, and the first fuel may be delivered as a reductant for the exhaust gas treatment system under a third condition, as will be described in greater detail below with reference to FIG. 6. In such an embodiment, the first and second conditions may be based on temperature in the cylinder, for example, and the third condition may be based an amount of $NO_x$ in the exhaust gas stream. The second injection of the first fuel may occur during an expansion stroke, for example, when the exhaust valve is open such that the second fuel is not combusted and exits the cylinder 108 to the exhaust gas treatment device 166 where it serves as a reductant.

As described above, FIGS. 1, 2, and 3 show only one cylinder of a multi-cylinder engine. As such each cylinder may similarly include its own set of intake/exhaust valves, fuel injector(s), spark plug, etc. In some embodiments, the engine 106 may be a V-12 engine which includes 12 cylinders. For example, FIG. 4 shows an example embodiment of a V-12 engine which is approximately to scale, and which may be included in the vehicle systems of FIGS. 1, 2, and 3.

Figure 4:
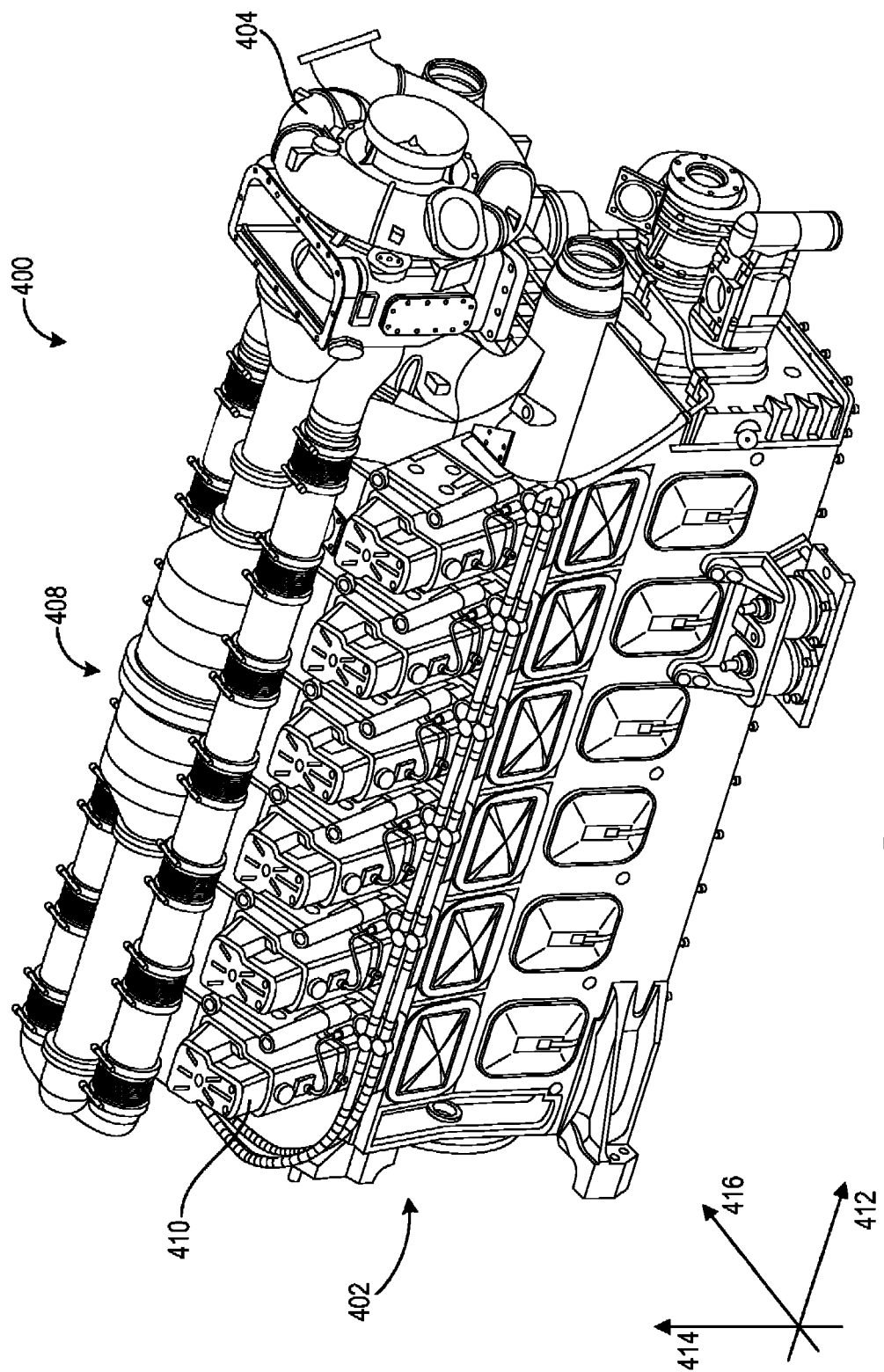
FIG. 4 shows a perspective view, approximately to scale, of an engine with a turbocharger and an exhaust gas treatment system.

In the example of FIG. 4, engine 402 is a V-engine which includes two banks of cylinders that are positioned at an angle of less than 180 degrees with respect to one another such that they have a V-shaped inboard region and appear as a V when viewed along a longitudinal axis of the engine. The longitudinal axis of the engine is defined by its longest dimension in this example. In the example of FIG. 4, the longitudinal direction is indicated by 412, the vertical direction is indicated by 414, and the lateral direction is indicated by 416. Each bank of cylinders includes a plurality of cylinders 410 (e.g., each bank includes six cylinders). The engine system 400 further includes a turbocharger 404 positioned at a front side of the engine and an exhaust gas treatment system 408 positioned on a top portion of the engine.

In a locomotive system, when an engine such as the V-12 engine depicted in FIG. 4 is positioned in the vehicle, packaging space may be limited. By using the first fuel as a fuel for combustion as well as a reductant, the size of the system may be reduced, as a separate system for reductant injection may not be needed. In other embodiments, the vehicle systems depicted in FIGS. 1, 2, and 3 may include an engine which is a V-6, V-16, I-4, I-6, I-8, opposed 4, or another engine type.

Continuing to FIG. 5, a flow chart illustrating a method 500 for injecting a first fuel (e.g., ethanol) in an exhaust passage upstream of an exhaust gas treatment device as a reductant for the exhaust gas treatment device is shown. Method 500 may be employed in a system such as vehicle system 100 depicted in FIG. 1. Specifically, method 500 determines an amount of $NO_x$ in the exhaust gas stream and injects the first fuel to the exhaust gas treatment device accordingly.

At 510 of method 500, operating conditions are determined. Operating conditions may include exhaust temperature, air fuel ratio, amount of reductant stored in the exhaust gas treatment device, and the like.

Once the operating conditions are determined, method 500 proceeds to 512 where an amount of $NO_x$ upstream of the exhaust gas treatment device is measured. For example, exhaust gas sensor 170 described above with reference to FIG. 1 may be used to indicate a concentration of $NO_x$ in the exhaust gas emitted from the engine. At 514, an amount of $NO_x$ downstream of the exhaust gas treatment device is measured. For example, exhaust gas sensor 172 described above with reference to FIG. 1 may be used to indicate a concentration of $NO_x$ downstream of the exhaust gas treatment device.

At 518 of method 500 it is determined if the $NO_x$ conversion efficiency is less than a threshold value. For example, the controller may use the $NO_x$ measurements obtained at 512 and 514 may be used to calculate the $NO_x$ conversion efficiency. If the $NO_x$ conversion efficiency is less than threshold value, $NO_x$ may be passing through the exhaust gas treatment device without being converted. As such, at 520 of method 500, the first fuel is injected in the exhaust passage upstream of the exhaust gas treatment device in order to increase the amount of $NO_x$ that is converted as the exhaust gas stream passes through the exhaust gas treatment device.

On the other hand, if it is determined that the $NO_x$ conversion efficiency is greater than the threshold value, method 500 moves to 520 where it is determined if the reductant storage amount is less than a threshold amount. The threshold amount may be based on current operating conditions of the engine such as air fuel ratio, exhaust gas treatment device temperature, or the like.

If it is determined that the reductant storage amount is greater than the threshold amount, the routine ends. In contrast, if it is determined that the reductant storage amount is less than the threshold amount, method 500 moves to 518 and the first fuel is injected in the exhaust passage upstream of the exhaust treatment device in order to increase the amount of reductant stored in the device.

Thus, by including an injector in the exhaust passage, the first fuel of a dual fuel engine, where the first fuel (e.g., ethanol) is different from the second fuel (e.g., diesel), may be injected upstream of the exhaust gas treatment device as a reductant for the exhaust gas treatment device.

FIG. 6 shows a flow chart illustrating a method 600 for injecting a first fuel (e.g., ethanol) and a second fuel (e.g., diesel) in a dual fuel engine during an engine cycle, such as engine 106 described above with reference to FIGS. 2 and 3 is shown. Specifically, the method 600 determines operating conditions and injects fuel to the cylinders of the engine and to the exhaust gas treatment device accordingly.

At 610 of method 600, operating conditions are determined. The operating conditions may include cylinder temperature, cylinder pressure, $NO_x$ conversion efficiency, cylinder pressure, air fuel ratio, and the like.

Once the operating conditions are determined, method 600 continues to 612 where it is determined if the first cylinder temperature is greater than a first threshold temperature. For example, the first threshold temperature may be a temperature at which the first fuel can mix with intake air in the cylinder at the instantaneous pressure of the cylinder such that the first fuel is not ignited and pre-mixing of the first fuel and intake air occurs. In some examples, the first threshold temperature may correspond to a position of the cylinder during the engine cycle.

If it is determined that the cylinder temperature is not greater than the first threshold temperature, method 600 returns to 612 until the temperature of the cylinder is less than the first threshold temperature. Once it is determined the cylinder temperature is greater than the threshold temperature, method 600 proceeds to 614 where the first fuel is injected to the cylinder.

In an embodiment in which the first fuel injector is a port fuel injector, such as depicted in FIG. 2, the first threshold temperature may occur when the intake valve is open during the intake stroke, for example. In an embodiment in which the first fuel injector is a direct fuel injector, such as depicted in FIG. 3, the first threshold temperature may occur late in the intake stroke after the intake valve is closed or early in the compression stroke, for example. In other examples, the first fuel may be directly injected to the cylinder during the compression stroke or during the power stroke of the engine cycle, or combinations thereof.

At 616 of method 600, it is determined if the cylinder temperature is greater than a second threshold temperature. The second threshold temperature may be higher than the first threshold temperature. For example, the second threshold temperature may correspond to a temperature below which the second fuel ignites in the combustion chamber. In this manner, pre-mixing of the second fuel before combustion resulting in relatively low flame temperatures and local equivalence ratios that are lean, for example.

If it is determined that the cylinder temperature is less than the second threshold temperature, method 600 returns to 616 until the temperature of the cylinder is greater than the second threshold temperature. Once it is determined that the cylinder temperature is greater than the second threshold temperature, method 600 continues to 618 where the second fuel is injected to the cylinder.

In an embodiment in which the first fuel injector is a port injector or in an embodiment in which the first fuel injector is a direct injector, the second fuel may be injected during the compression stroke such that the second fuel may be pre-mixed with the first fuel and intake air in the cylinder (e.g., 40-50 degrees before top dead center). As such, local flame temperatures may be lower and $NO_x$ production may be reduced, for example. Further, by pre-mixing the second fuel with the first fuel and air, particulate emissions may be reduced.

At 620, it is determined if the $NO_x$ conversion efficiency is greater than a threshold value. If it is determined that the $NO_x$ conversion efficiency is less than the threshold value, method 600 returns to the start. In contrast, if it is determined that the $NO_x$ conversion efficiency is greater than the threshold value, method 600 moves to 622 where the first fuel is injected to the cylinder. For example, the first fuel may be injected by direct injection after combustion has occurred during the exhaust stroke. As another example, the first fuel may be injected by port or direct injection during positive valve overlap during the end of the exhaust stroke/beginning of the intake stroke with both the intake and exhaust valve(s) being at least partially open. This may generate scavenging, where the engine is boosted and a pressure in the intake manifold is greater than a pressure in the exhaust manifold such that air travels from the intake to the exhaust of the cylinder through the open valves without participating in the combustion process. Thus, the first fuel injected into this fresh airflow (either in the intake port or into the cylinder) may be carried out of the cylinder to the exhaust system. In this manner, the first fuel may exit the cylinder without being combusted so that it may be utilized as a reductant in the exhaust gas treatment device.

Method 600 may be repeated for each cylinder of the multi-cylinder engine for example. In this manner, the second fuel may be injected to each cylinder of the engine for combustion and as a reductant for the exhaust gas treatment device. Further, by injecting each fuel at a time when pre-mixing can occur, flame temperatures, $NO_x$ formation, and particulate formation may be reduced. Thus, engine efficiency may be increased while emissions are reduced.

Figure 7:
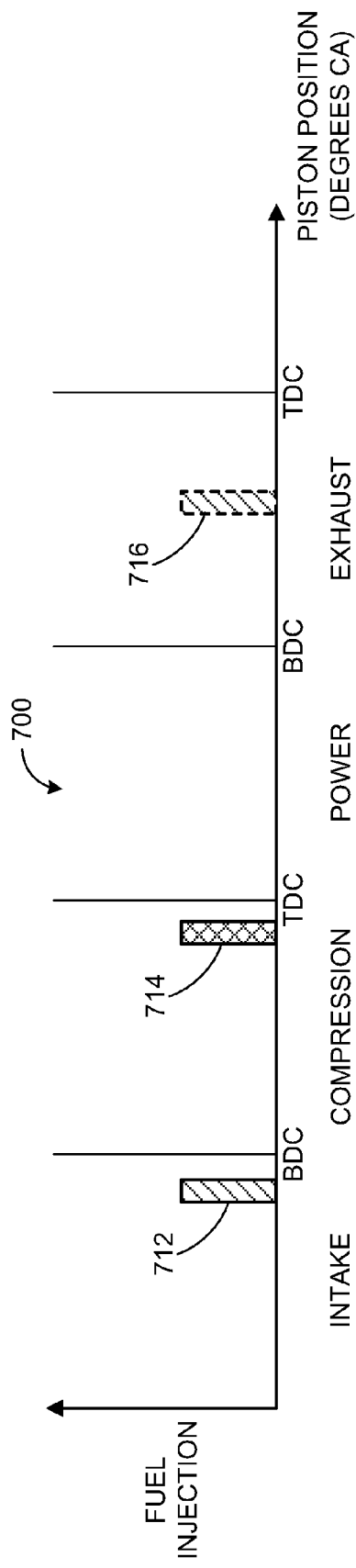
FIGS. 7-8 show timing charts for injecting fuel in a dual fuel engine.
Figure 8:
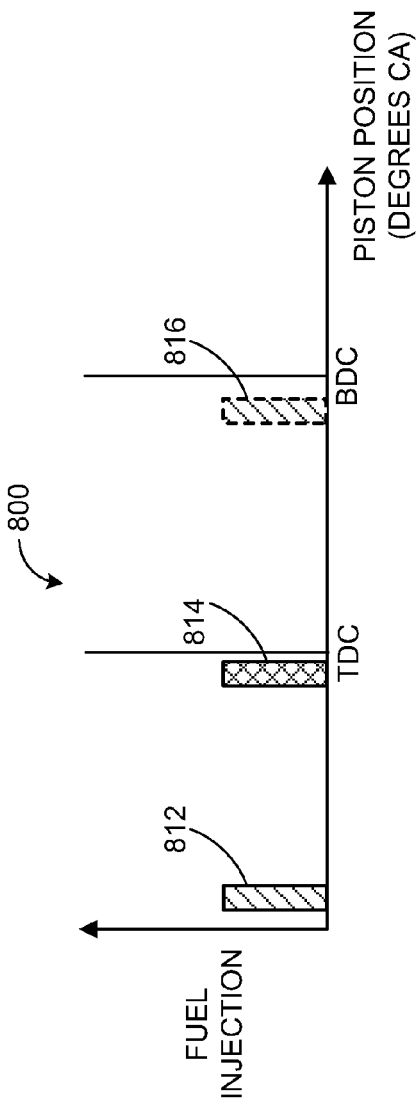

FIGS. 7 and 8 show non-limiting examples of timing charts for fuel injection in a dual fuel engine, such as engine 106 described above with reference to FIGS. 2 and 3. Specifically, FIGS. 7 and 8 show fuel injection timing in a cylinder over one engine cycle in a four-stroke engine and a two-stroke engine, respectively.

In the example embodiment of FIG. 7, a first injection of a first fuel is illustrated as occurring near bottom dead center (BDC) during the intake stroke of the four-stroke engine cycle at 712 of timing chart 700. Injection of the second fuel is illustrated as occurring near top dead center (TDC) during the compression stroke of the four-stroke engine cycle at 714 of timing chart 700. In this manner, the first fuel may be injected so that pre-mixing of the first fuel and intake air occurs in the cylinder before the injection of the second fuel. In some embodiments, the injection of the second fuel may trigger a combustion event, for example.

As described above, based on a condition such as a low $NO_x$ conversion efficiency, the first fuel may be injected a second time. The second injection of the first fuel is illustrated as occurring during the exhaust stroke at 716 of timing chart 700 while the exhaust valve is open. In other embodiments, the second injection of the first fuel (by port injection or by direct injection) may occur during the exhaust and/or intake stroke during valve overlap, as described above. In this manner, the second injection of the first fuel may bypass combustion in the cylinder so that the first fuel may serve as a reductant for an exhaust gas treatment device.

In the example embodiment of FIG. 8, a first injection of a first fuel is illustrated as occurring early in the first stroke (e.g., after BDC) at 812 of timing chart 800. Injection of the second fuel is illustrated as occurring late in the first stroke, just before TDC at 814 of timing chart 800. In such an embodiment, injection of the first fuel early in the first stroke provides an opportunity for pre-mixing of the first fuel and intake air before the second fuel is injected late in the first stroke.

Further, a second injection of the first fuel is illustrated as occurring close to BDC during the second stroke at 816 of timing chart 800. In this way, the second injection of the first fuel may be delivered such that it is not combusted during the two-stroke engine cycle. Thus, the first fuel may exit the cylinder during the second stroke and flow to the exhaust gas treatment device to reduce $NO_x$ emissions, for example.

It should be understood, the relative injection amounts and timings of the first fuel and second fuel depicted in FIGS. 7 and 8 are for the purpose of example. In some embodiments, a greater quantity of the first fuel may be injected during the first injection of the first fuel than the second injection of the first fuel, or vice versa. Similarly, a quantity of the second fuel may be less than, greater than, or equal to the quantity of first fuel delivered during the first or second injection of the first fuel, for example, based on current operating conditions. Further, the timing of each injection may vary based on current operation conditions.

As explained above, the terms "high temperature" and "low temperature" are relative, meaning that "high" temperature is a temperature higher than a "low" temperature. Conversely, a "low" temperature is a temperature lower than a "high" temperature.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for treatment of an exhaust gas in a dual fuel engine, comprising:
   under a first condition, delivering a first fuel for combustion in the dual fuel engine;
   under a second condition, delivering a second fuel for combustion in the dual fuel engine, where the second fuel is different than the first fuel, and wherein the first condition comprises a temperature of a cylinder of the dual fuel engine being above a first threshold temperature, and the second condition comprises the temperature of the cylinder being above a second threshold temperature, where the first threshold temperature is lower than the second threshold temperature, wherein the second threshold temperature corresponds to a temperature below which the second fuel ignites; and
   under a third condition, delivering the first fuel as a reductant for the treatment of the exhaust gas.

2. The method of claim 1, wherein the first fuel is delivered to one or more cylinders of the dual fuel engine by direct injection during an intake stroke of an engine cycle, and wherein the third condition includes when a nitrogen oxide conversion efficiency decreases below a threshold value.

3. The method of claim 1, wherein, during the second condition, the second fuel is delivered to one or more cylinders of the dual fuel engine by direct injection.

4. The method of claim 3, wherein delivering the first fuel as a reductant includes delivering the first fuel to the one or more cylinders of the dual fuel engine during an exhaust stroke of an engine cycle.

5. The method of claim 1, wherein, during the second condition, the first fuel is delivered to one or more cylinders of the dual fuel engine by port injection during an intake stroke of an engine cycle.

6. The method of claim 5, wherein delivering the first fuel as a reductant includes delivering the first fuel by port injection to the one or more cylinders of the dual fuel engine during positive valve overlap while the dual fuel engine is boosted.

7. The method of claim 5, wherein delivering the first fuel as a reductant includes delivering the first fuel by an injector positioned upstream of a selective catalytic reduction catalyst in the exhaust gas treatment system.

8. The method of claim 5, wherein the exhaust gas treatment system is positioned upstream of an exhaust gas recirculation inlet.

9. The method of claim 1, wherein the first threshold temperature corresponds to a temperature at which the first fuel can mix with the intake air in the cylinder at an instantaneous pressure of the cylinder such that the first fuel is not ignited and premixing of the first fuel and intake air occurs.

10. A method for treatment of an exhaust gas in a dual fuel engine, comprising:
under a first condition, delivering a first fuel directly into a cylinder of the dual fuel engine for combustion in the dual fuel engine during an intake stroke of an engine cycle;
under a second condition, delivering a second fuel in the cylinder of the dual fuel engine for combustion in the dual fuel engine during a compression stroke of the engine cycle, where the second fuel is different than the first fuel, and wherein the first condition comprises a temperature of the cylinder being above a first threshold temperature, and the second condition comprises the temperature of the cylinder being above a second threshold temperature, where the first threshold temperature is lower than the second threshold temperature, wherein the second threshold temperature corresponds to a temperature below which the second fuel ignites; and
under a third condition, delivering the first fuel in the cylinder of the dual fuel engine as a reductant for a selective catalytic reduction catalyst in the exhaust gas treatment system during an exhaust stroke of the engine cycle.

11. The method of claim 10, wherein the first fuel is delivered by a first direct injector in the cylinder.

12. The method of claim 10, wherein the second fuel is delivered by a second direct injector in the cylinder.

13. The method of claim 10, wherein the selective catalytic reduction catalyst is positioned upstream of a turbine of a turbocharger.

14. The method of claim 10, wherein the third condition includes nitrogen oxide conversion efficiency below a threshold value.

15. The method of claim 10, wherein the third condition includes an amount of reductant stored in the selective catalytic reduction catalyst less than a threshold amount.

16. The method of claim 10, wherein the first fuel is ethanol and the second fuel is diesel.

17. The method of claim 10, wherein the first threshold temperature corresponds to a temperature at which the first fuel can mix with the intake air in the cylinder at an instantaneous pressure of the cylinder such that the first fuel is not ignited and premixing of the first fuel and intake air occurs.

18. A system for a dual fuel engine, comprising:
a first fuel system for ethanol fuel;
a second fuel system for diesel fuel;
a selective catalytic reduction catalyst positioned in an exhaust passage of the dual fuel engine;
a controller configured to, during a single cylinder cycle, deliver a first injection of the ethanol fuel for combustion in the dual fuel engine under a first condition, deliver the diesel fuel under a second condition, and deliver a second injection of the ethanol fuel during an exhaust stroke of the cycle as a reductant for the selective catalytic reduction catalyst, and wherein the first condition comprises a temperature of a cylinder of the dual fuel engine being above a first threshold temperature, and the second condition comprises the temperature of the cylinder being above a second threshold temperature, where the first threshold temperature is lower than the second threshold temperature, wherein the second threshold temperature corresponds to a temperature below which the diesel fuel ignites.

19. The system of claim 18, wherein the dual fuel engine is positioned in a locomotive, and the dual fuel engine is a V-12 four-stroke engine.

20. The system of claim 18 wherein the cylinder includes a first direct injector and a second direct injector, the first injector delivering the first and second injection of the ethanol and the second injector delivering the diesel fuel, and wherein the second injection of ethanol is delivered during valve overlap.

21. The method of claim 18, wherein the first threshold temperature corresponds to a temperature at which the ethanol can mix with the intake air in the cylinder at an instantaneous pressure of the cylinder such that the ethanol is not ignited and premixing of the ethanol and intake air occurs.

* * * * *